(12) United States Patent
Aumann et al.

(10) Patent No.: US 11,585,231 B2
(45) Date of Patent: Feb. 21, 2023

(54) DEVICE AND METHOD FOR OPERATING VOLUMETRIC EXPANSION MACHINES

(71) Applicants: ORCAN ENERGY AG, Munich (DE); Bitzer Kühlmaschinenbau GmbH, Sindelfingen (DE)

(72) Inventors: Richard Aumann, Munich (DE); Andreas Grill, Munich (DE); Roy Langer, Munich (DE); Andreas Schuster, Tussenhausen (DE)

(73) Assignee: BITZER KÜHLMASCHINENBAU GMBH, Sindelfingen (DE)

( * ) Notice: Subject to any disclaimer, the term of this patent is extended or adjusted under 35 U.S.C. 154(b) by 0 days.

(21) Appl. No.: 17/219,803

(22) Filed: Mar. 31, 2021

(65) Prior Publication Data

US 2021/0215058 A1 Jul. 15, 2021

Related U.S. Application Data

(63) Continuation of application No. 15/104,923, filed as application No. PCT/EP2014/068735 on Sep. 3, 2014, now Pat. No. 10,968,766.

(30) Foreign Application Priority Data

Dec. 16, 2013 (EP) .................................... 13197480

(51) Int. Cl.
*F01K 25/00* (2006.01)
*F01D 15/10* (2006.01)
(Continued)

(52) U.S. Cl.
CPC ............. *F01D 15/10* (2013.01); *F01D 17/00* (2013.01); *F01K 25/10* (2013.01); *F25B 11/02* (2013.01);
(Continued)

(58) Field of Classification Search
CPC .......... F01D 15/10; F01D 17/00; F25B 11/02; F25B 2500/16; H02K 7/1823
See application file for complete search history.

(56) References Cited

U.S. PATENT DOCUMENTS 3,024,366 A 3/1962 Yanagimachi
4,105,372 A 8/1978 Mishina et al.
(Continued)

FOREIGN PATENT DOCUMENTS

DE 202012006055 U1 9/2012
DE 102011054793 A1 4/2013
(Continued)

OTHER PUBLICATIONS

Chinese Examination Report for corresponding Chinese Patent Application No. 201480075515.6, dated Mar. 1, 2017.
(Continued)

*Primary Examiner* — Matthew T Largi
(74) *Attorney, Agent, or Firm* — Moore & Van Allen PLLC; Henry B. Ward, III

(57) ABSTRACT

A device is provided comprising an expansion machine for generating mechanical energy by expanding vapor of a working medium; a generator connected to a shaft of the expansion machine and used for generating electric energy from mechanical energy of the expansion machine; wherein the expansion machine and the generator form a structural unit with an exhaust vapor chamber between the expansion machine and the generator, and wherein, when the expansion machine is in operation, working medium expanded into the exhaust vapor chamber contacts the generator; and means for feeding, in particular injecting, a liquid working medium into the exhaust vapor chamber. Also provided is an ORC device comprising the device and a method for operating the device.

17 Claims, 2 Drawing Sheets

(51) Int. Cl.
  *F01K 25/10* (2006.01)
  *F01D 17/00* (2006.01)
  *F25B 11/02* (2006.01)
  *H02K 7/18* (2006.01)

(52) U.S. Cl.
  CPC ........ H02K 7/1823 (2013.01); *F25B 2500/16* (2013.01)

(56) References Cited

U.S. PATENT DOCUMENTS

| | | | | |
|---|---|---|---|---|
| 4,363,216 | A | * | 12/1982 | Bronicki ................. F01D 25/22 60/657 |
| 4,740,711 | A | * | 4/1988 | Sato ........................ F03B 13/10 290/52 |
| 6,058,695 | A | | 5/2000 | Ranasinghe et al. |
| 8,146,360 | B2 | | 4/2012 | Myers et al. |
| 8,801,398 | B2 | | 8/2014 | Korenblik |
| 9,689,281 | B2 | | 6/2017 | Cogswell et al. |
| 2003/0074895 | A1 | * | 4/2003 | McFarland ............. F01K 25/10 60/395 |
| 2006/0186671 | A1 | * | 8/2006 | Honda .................... F03B 13/10 290/54 |
| 2008/0252077 | A1 | * | 10/2008 | Myers .................. H02K 7/1823 290/52 |
| 2011/0289922 | A1 | | 12/2011 | Myers et al. |
| 2012/0235415 | A1 | * | 9/2012 | Madison ................. F03B 13/00 290/54 |
| 2012/0306206 | A1 | | 12/2012 | Agrawal et al. |
| 2012/0323530 | A1 | * | 12/2012 | Mazzaro ................. F01D 17/08 702/182 |
| 2013/0098037 | A1 | * | 4/2013 | Maier .................. H02K 7/1823 60/647 |
| 2013/0168964 | A1 | * | 7/2013 | Xu ........................... H02K 3/44 290/52 |
| 2013/0177389 | A1 | | 7/2013 | Maier et al. |
| 2013/0207396 | A1 | * | 8/2013 | Tsuboi .................... F01D 25/12 290/52 |
| 2014/0190172 | A1 | | 7/2014 | Maier |
| 2016/0281542 | A1 | * | 9/2016 | Adachi .................. F01K 25/08 |

FOREIGN PATENT DOCUMENTS

| | | |
|---|---|---|
| EP | 0952316 A2 | 10/1999 |
| WO | 02090747 A2 | 11/2002 |
| WO | 2011149916 A1 | 12/2011 |
| WO | 2013060748 A1 | 5/2013 |

OTHER PUBLICATIONS

European Search Report for European Patent Application No. EP13197480.0, dated May 16, 2014.
International Search Report for International Patent Application No. PCT/EP2014/068735, dated Apr. 20, 2016.
Written Opinion for International Patent Application No. PCT/EP2014/068735, dated Apr. 20, 2016.

* cited by examiner

DEVICE AND METHOD FOR OPERATING VOLUMETRIC EXPANSION MACHINES

FIELD OF THE INVENTION

The present invention relates to a device comprising an expansion machine for generating mechanical energy by expanding vapor of a working medium; and a generator connected to a shaft of the expansion machine and used for generating electric energy from mechanical energy of the expansion machine; wherein the expansion machine and the generator form a structural unit with an exhaust vapor chamber between the expansion machine and the generator. The invention also relates to an ORC system and a method for operating an expansion machine.

PRIOR ART

An ORC system, i.e. a system for gaining electric energy from heat energy making use of the Organic Rankine Cycle as a thermodynamic cycle, comprises the following main components: a feed pump conveying the liquid working medium to an evaporator with an increase in pressure, the evaporator itself, in which the working medium is evaporated by addition of heat and, optionally, also superheated, an expansion machine in which the highly pressurized vapor is expanded, whereby mechanical energy is generated, said mechanical energy being converted into electric energy through a generator, and a condenser in which the low pressure vapor coming from the expansion machine is liquefied. From the condenser the liquid working medium is returned to the feed pump of the system via an optional storage tank (feed tank) and a suction line.

Using modified standard compression machines originating from air-conditioning and refrigeration technology in ORC systems as expansion machines is advantageous for various reasons, the motor M of the compression machine being then used as a generator G (FIG. 1). In order to prevent a possible leakage of the refrigerant to the environment, it will be expedient to employ semi-hermetic or hermetic expansion machines for this case of use. The generator G is here fixedly integrated in the housing, whereby the leakage-prone, high-maintenance shaft feedthrough through the housing of the expansion machine can be dispensed with.

In the case of use as a compressor in the field of air-conditioning and refrigeration technology, the motor M is used for driving the compressor and the motor is cooled through the cold vapor flowing across the motor (FIG. 1A). In the case of use as an expansion machine in an ORC system, the generator G is therefore exposed to the temperature of the expanded vapor of the working medium, a circumstance that will be unproblematic for the generator G at exhaust vapor temperatures below 100° C. (FIG. 1B).

For increasing the efficiency (higher thermal efficiency) and for extending the field of use, it will, however, be expedient to increase these vapor temperatures. When the generator G has applied thereto an exhaust vapor temperature exceeding 100° C., this will be problematic as far as a trouble-free operation is concerned. In this case, the limit temperature for the generator winding may be reached or exceeded (e.g. 120° C. in FIG. 1C). Operating the generator and thus the expansion machine is then no longer possible, or will lead to premature aging or failure of the insulation of the generator winding. Hence, especially the winding temperatures are of decisive importance for the generator. The temperature may be applied to the generator e.g. through thermal conduction in the housing.

Currently used and available expansion machines have operating temperatures with limited maximum values. On the one hand, high temperatures in the expansion machine adversely affect—as described above—the near-by generator. As regards this generator, there are limit temperatures which must not be exceeded. On the other hand, the viscosity of the bearing lubricants is problematic, said viscosity decreasing at higher temperatures, whereby bearing lubrication deteriorates.

In order to still allow the use of waste heat from an ORC process for the purpose of heating or as process heat, the heat must be given off on a suitable temperature level (60-100° C.). This, however, leads to a poor efficiency of the overall system in the case of low live vapor temperatures. It will therefore be advantageous to counteract this effect with higher expansion machine infeed temperatures. However, higher temperatures have the effect that the temperature limits for the use of the expansion machine will be exceeded (through temperature limits for the generator), whereby disadvantages are caused.

DESCRIPTION OF THE INVENTION

It is the object of the invention to overcome the above described drawbacks at least partially.

This object is achieved by a device according to claim 1. The device according to the present invention comprises an expansion machine for generating mechanical energy by expanding vapor of a working medium; a generator connected to the shaft of the expansion machine and used for generating electric energy from mechanical energy of the expansion machine; wherein the expansion machine and the generator form a structural unit with an exhaust vapor chamber between the expansion machine and the generator, and wherein, when the expansion machine is in operation, working medium expanded into the exhaust vapor chamber contacts the generator; and means for feeding, in particular injecting, a liquid working medium into the exhaust vapor chamber.

The expanded working medium (exhaust vapor) is cooled by a liquid working medium downstream of the expansion machine. Due to the infeed, in particular injection into the exhaust vapor chamber, the liquid medium evaporates upon coming into contact with the hot exhaust vapor and lowers thus the temperature in the expanded medium. The field of use of the volumetric expansion machine is extended, thus allowing the expansion machine to be used for higher vapor infeed temperatures (e.g. higher than 130° C.). The generator on the expansion machine is sufficiently cooled and protected against excessive heating. This also leads to an increase in its efficiency. A temperature gradient between the generator and the exhaust vapor of 20 K or more is here advantageous, since this will guarantee good cooling of the generator.

The device according to the present invention can be further developed such that the means for feeding working medium into the exhaust vapor chamber comprises one or a plurality of openings in a housing of the structural unit. This provides a possibility of feeding working medium into the exhaust vapor chamber.

According to another further development, the shaft may be configured as a hollow shaft and the means for feeding working medium into the exhaust vapor chamber may comprise one or a plurality of openings in said hollow shaft. The working medium fed for the purpose of cooling the exhaust vapor can thus be introduced centrally into the exhaust vapor chamber.

In accordance with another further development, the means for feeding working medium into the exhaust vapor chamber may comprise one or a plurality of nozzles, which may be arranged in particular at one or a plurality of the openings, the nozzle or nozzles being especially configured to be controllable. By means of the nozzles, a fine distribution of the working medium fed into the exhaust vapor chamber is accomplished. The injection or spraying-in leads to a formation of droplets, which evaporate in the exhaust vapor chamber partly or fully and which extract energy from the exhaust vapor due to the evaporation heat thus taken up.

According to another further development, the device according to the present invention or one of its further developments may additionally comprise a turbulence unit for generating a turbulent flow in the exhaust vapor chamber. In this way, a good distribution of the working medium fed for the purpose of cooling is accomplished, the exhaust vapor being thus cooled more uniformly in space. In addition, a finer distribution of the working medium in the form of smaller droplets leads to a faster and more complete evaporation of the liquid working medium in the exhaust vapor chamber and this also results in better cooling of the exhaust vapor.

Another further development consists in that the means for feeding working medium into the exhaust vapor chamber may comprise a feed line for liquid working medium leading into the exhaust vapor chamber.

This can be further developed such that the means for feeding working medium into the exhaust vapor chamber additionally comprises an orifice or a valve, in particular a controlled or a regulated valve, for adjusting a mass flow of the fed working medium in the feed line.

According to another further development, a temperature sensor may be provided in the exhaust vapor chamber for measuring the vapor temperature or in the generator for measuring the winding temperature, said temperature sensor being in particular a PTC temperature sensor; and, optionally, a control or regulating unit may be provided for controlling or regulating the valve or the orifice, depending on the measured temperature, in particular for switching the mass flow in the feed line on and off.

The above-mentioned object is additionally achieved by an ORC device, comprising a device according to the present invention or one of the further developments of the latter; a feed pump for pumping liquid working medium to an evaporator; the evaporator for evaporating the liquid working medium; and a condenser for condensing the vaporous working medium which exits the structural unit comprising the expansion machine and the generator.

The ORC device according to the present invention may be further developed such that the feed line for liquid working medium leading into the exhaust vapor chamber is in fluid communication with a line between the feed pump and the evaporator; or the feed line for liquid working medium leading into the exhaust vapor chamber is in fluid communication with an intermediate space of a multi-stage feed pump; or the feed line for liquid working medium leading into the exhaust vapor chamber is in fluid communication with a line between two feed pumps of an arrangement comprising a plurality of consecutive feed pumps. Due to the tapping of the multi-stage feed pump or tapping between two feed pumps, the additional expenditure of energy is kept low. Alternatively, the liquid may be conveyed through a separate pump, which is switched on and off, e.g. in a temperature-dependent manner.

According to another further development, there may be provided an additional feed line for feeding a lubricating medium to one or a plurality of lubrication points of the expansion machine, and a heat exchanger, in particular a counterflow-type plate heat exchanger, for cooling the lubricating medium with the working medium conducted to the exhaust vapor chamber. Lubrication of the bearings of the expansion machine is improved by the additional cooling of the lubricant.

The above-mentioned object is additionally achieved by a method for operating an expansion machine according to claim 12.

The method according to the present invention comprises the following steps: generating mechanical energy by expanding vapor of a working medium in the expansion machine; generating electric energy from mechanical energy of the expansion machine by a generator connected to a shaft of the expansion machine; wherein the expansion machine and the generator form a structural unit with an exhaust vapor chamber between the expansion machine and the generator, and wherein, when the expansion machine is in operation, working medium expanded into the exhaust vapor chamber contacts the generator; and feeding, in particular injecting, working medium into the exhaust vapor chamber for cooling the expanded vapor.

The method according to the present invention has the advantages that have already been described in connection with the device according to the present invention.

The method according to the present invention can be further developed such that the further step of adjusting a mass flow of the fed working medium can be carried out in a feed line for liquid working medium leading into the exhaust vapor chamber.

According to another further development, the following additional steps may be provided:

measuring the vapor temperature in the exhaust vapor chamber; or measuring a winding temperature of the generator; and adjusting the mass flow of the fed working medium by means of controlling or regulating a valve or an orifice in the feed line, depending on the measured temperature, in particular switching the mass flow in the feed line on and off.

According to another further development, the following additional steps may be provided: feeding a lubricating medium to one or a plurality of lubrication points of the expansion machine; and cooling the lubricating medium by the working medium fed to the exhaust vapor chamber.

The above-mentioned further developments may be used separately or they may be combined with one another in a suitable manner.

Additional features and exemplary embodiments as well as advantages of the present invention will be explained in more detail hereinafter with reference to the drawings. It goes without saying that the embodiments do not exhaust the scope of the present invention. It also goes without saying that some or all of the features described hereinafter may also be combined with one another in other ways.

DRAWINGS

FIG. 1 shows the prior art

EMBODIMENTS

Figure 1A:
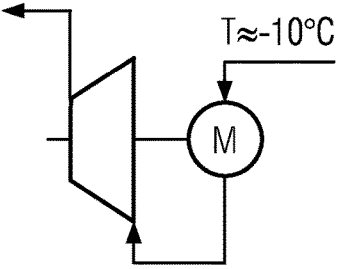
FIG. 1A shows a compressor (prior art in air conditioning systems)
Figure 1B:
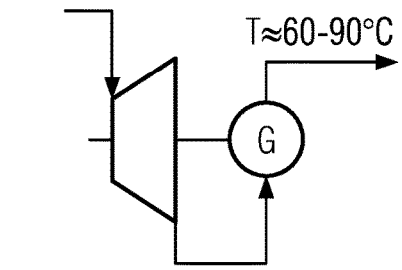
FIG. 1B shows an expander (prior art in ORC systems)
Figure 1C:
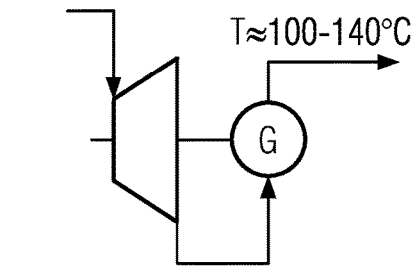
FIG. 1C shows an expander (ORC-system development target)

According to the present invention an expanded working medium (exhaust vapor) is cooled by a liquid working medium downstream of the expansion machine. Through injection into the vapor chamber, the liquid working medium evaporates, thus leading to a decrease in temperature in the expanded working medium. According to a further development, the bearing lubricant is cooled by means of the liquid working medium before it is applied to the bearing. According to another further development, the working medium used for the purpose of cooling is tapped off from the circuit at an appropriate stage of a multi-stage rotary pump.

The field of use of the volumetric expansion machine is extended, thus allowing the expansion machine to be used for higher vapor infeed temperatures (e.g. substantially higher than 130° C.). The generator at the expansion machine or at the turbine is sufficiently cooled and protected against excessive heating. This also leads to an increase in its efficiency. Lubrication of the bearings is improved by the additional cooling of the lubricating medium. Only a small number of new components is required for realizing this. These new components comprise a connection line for the liquid medium and, in addition, possibly a valve, one or more nozzles and a heat exchanger for the lubricant. The additional expenditure of energy is kept low due to the tapping of the feed pump.

The advantages of the present invention are to be seen in that the operation of standard expansion machines can be extended; the generator is protected against excessive heating; the efficiency of the generator is improved; lubrication of the bearings can be improved; higher temperature levels can be utilized and useful heat from the system can be given off; no or only a small number of new components will be necessary; and hardly any additional expenditure of energy will be required.

In particular in semi-hermetic and hermetic screw expansion machines, expanded vapor flows across the generator, which is cooled by said vapor. At high vapor temperatures (>120° C.), cooling of the generator is no longer guaranteed. It stands to reason that this effect can be counteracted by cooling the flowing vapor. To this end, a liquid working medium is injected into the vapor before the latter comes into contact with the generator and substantial cooling results from the evaporation enthalpy of said liquid working medium, sensible heat also being taken up to a minor extent. Cooling which utilizes the evaporation enthalpy is more effective than cooling without phase transition utilizing exclusively the heat capacity. For the working medium R245fa, which is the current state of the art in ORC systems, as well as for other media suitable for higher temperatures, the evaporation enthalpies exceed the specific heat capacities by a factor of approximately 100.

For use in ORC systems, liquid working medium can be tapped off downstream of the feed pump and injected into the vapor chamber for the purpose of cooling the vapor. Injection into the vapor chamber can take place through one or a plurality of suitable holes. For better distribution of the liquid medium and for faster evaporation due to a fine distribution in the form of small droplets, the use of one or of a plurality of nozzles is, however, recommended. In addition, the liquid cooling medium can be introduced in the vapor chamber via a hollow shaft provided with holes. To this end, it is advisable to use the shaft between the expansion machine and the generator. In order to optimize the distribution, a turbulence unit may be introduced in the vapor chamber. The mass flow required for cooling remains below 10% of the vapor mass flow when the vapor is cooled down by up to 10 K. This mass flow can be adjusted via a narrowing cross-section in the cooling line (e.g. via an orifice or a valve). When a nozzle is used for injection, the mass flow can be adjusted through a suitable nozzle.

The way in which the components of the ORC system are interconnected according to the present invention allows higher live-vapor and exhaust-vapor temperatures when standard components are used. The elevation to a higher temperature level allows the system to be operated in a combined heat and power (CHP) mode. The heat used for cooling the system can thus be used as thermal heat or process heat on a temperature level of approx. 80-100° C. and more.

Figure 2:
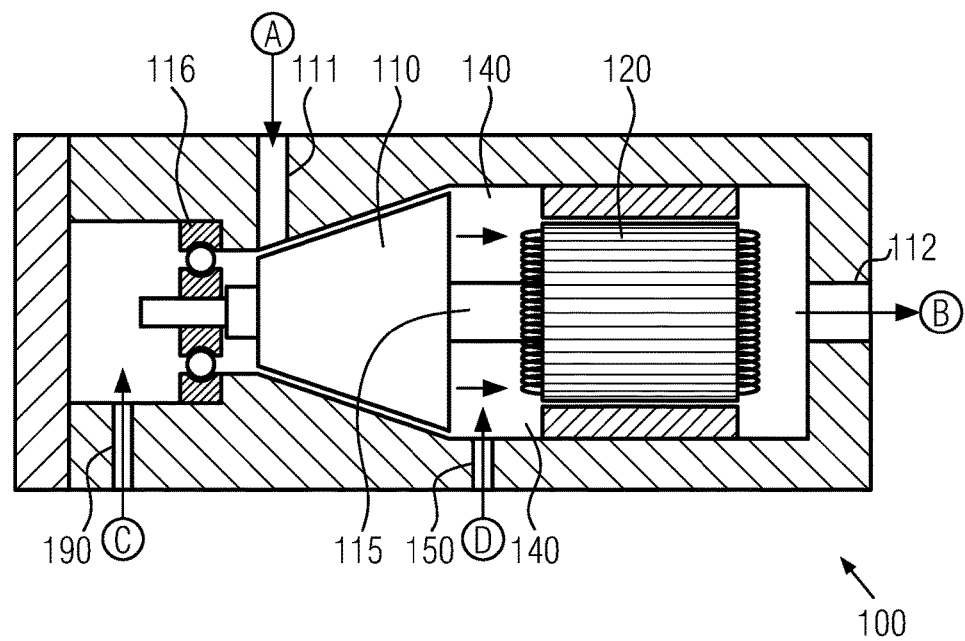
FIG. 2 shows an embodiment of the device according to the present invention

FIG. 2 shows an embodiment of a device according to the present invention. It is a simplified schematic representation (e.g. only one bearing for the shaft is shown). The device according to the present invention comprises an expansion machine 110 for generating mechanical energy by expanding the vapor of a working medium; a generator 120 connected to a shaft 115 of the expansion machine and used for generating electric energy from mechanical energy of the expansion machine; wherein the expansion machine 110 and the generator 120 form a structural unit 100 with an exhaust vapor chamber 140 between the expansion machine 110 and the generator 120, and wherein, when the expansion machine is in operation, working medium expanded into the exhaust vapor chamber 140 contacts the generator (by flowing e.g. through intermediate spaces between the stator and the rotor of the generator and/or in grooves in the housing of the structural unit 100 in the area of the generator); and means 150 for feeding, in particular injecting, a liquid working medium into the exhaust vapor chamber 140, the means 150 according to this embodiment comprising an opening 150 to the exhaust vapor chamber 140 in the structural unit 100. The working medium A enters at a high-pressure-side inlet 111 of the structural unit 100 and leaves the structural unit 100 at an outlet 112 as exhaust vapor B or as cooled exhaust vapor B. The shaft 115 is supported on a bearing 116 and an access 190 for a bearing lubricant C is provided. The liquid working medium injected into the opening 150 evaporates at least partially thus extracting thermal energy from the exhaust vapor, whereby the latter is cooled. The resultant temperature is a mixed temperature, which is lower, e.g. by 10-20 K, than the temperature of the exhaust vapor without cooling.

Figure 3:
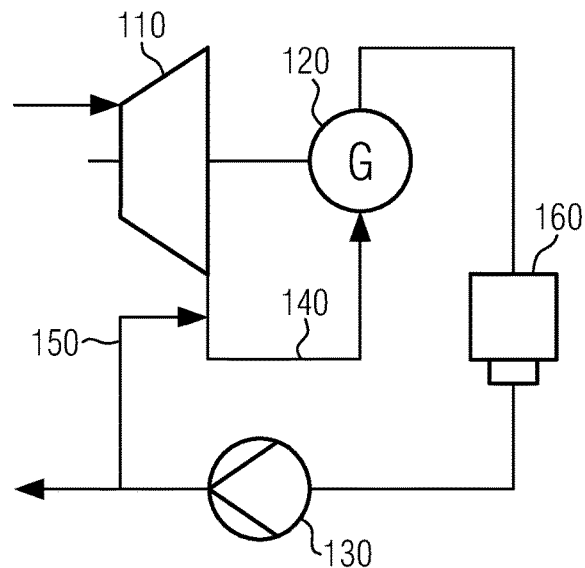
FIG. 3 shows a first embodiment of an ORC device according to the present invention

FIG. 3 shows a first embodiment of the ORC device. The ORC device comprises a device according to the present invention (e.g. according to FIG. 2) or one of the further developments thereof; a feed pump 130 for pumping liquid working medium to an evaporator (not shown); the evaporator being used for evaporating the liquid working medium from the feed pump; and a condenser 160 for condensing the vaporous working medium which exits the structural unit comprising the expansion machine 110 and the generator 120. The means 150 for feeding liquid working medium into the exhaust vapor chamber 140 comprises here also a feed line which taps off liquid working medium after the pump (high-pressure side), when seen in the direction of flow, and conducts it into the exhaust vapor chamber 140. The exhaust vapor chamber 140 is only shown schematically in the present and in the following figures and corresponds to the physical space 140 according to FIG. 2.

Figure 4:
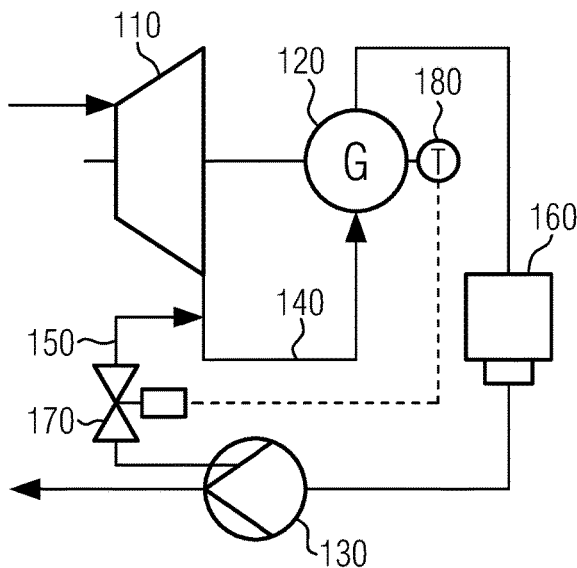
FIG. 4 shows a second embodiment of an ORC device according to the present invention

FIG. 4 shows a second embodiment of the ORC device. In comparison with the first embodiment shown in FIG. 3, said second embodiment additionally comprises a temperature sensor 180 (T) on the generator 120, by means of which the winding temperature is measured. The temperature sensor 180 may e.g. be a PTC temperature sensor (PTC=Positive Temperature Coefficient, thermistor). In addition, the line 150 has provided therein a switchable or controllable valve 170, which, on the basis of the temperature of the generator measured by the temperature sensor 180, controls the mass flow of the liquid working medium fed into the exhaust vapor chamber 140 for the purpose of cooling. For example, the valve 170 may be opened (or opened still wider), when a predetermined temperature limit value is reached or exceeded, whereas otherwise it is not open (or open only to a minor extent). Furthermore, tapping of a multi-stage feed pump 130 between two neighboring stages of the feed pump 130 is exemplarily carried out in the case of this embodiment.

Figure 5:
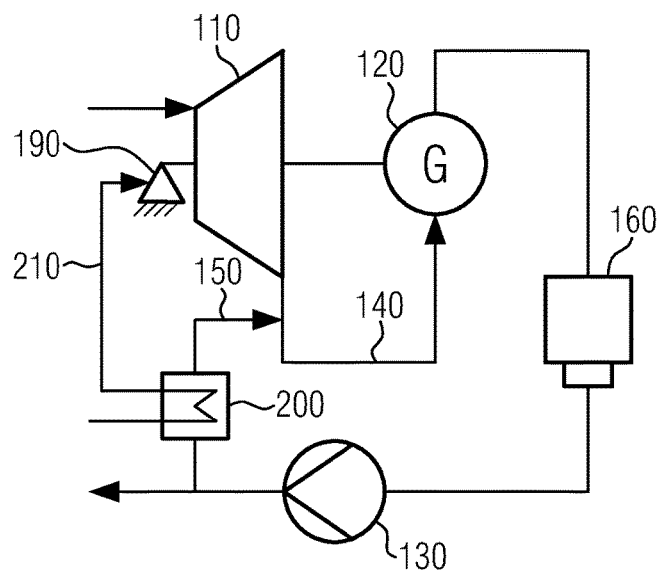
FIG. 5 shows a third embodiment of an ORC device according to the present invention

FIG. 5 shows a third embodiment of the ORC device according to the present invention. In comparison with the first embodiment shown in FIG. 3, said third embodiment additionally comprises a cooler 200 for cooling a lubricant fed in a lubricant line 210 to the bearing 116 of the expansion machine 110 for the purpose of lubrication. The cooler 200 is here configured as a heat exchanger, in which heat from the lubricant is transferred to liquid working medium, which is fed to the exhaust vapor chamber 140 for the purpose of cooling.

It follows that the benefit of cooling can be increased by cooling, e.g. in a counterflow-type plate heat exchanger, the lubricating medium for the bearings of the expansion machine, before it enters the bearing, through the liquid working medium used for the purpose of cooling, if the lubricant should have a temperature higher than that of the liquid working medium. When, in addition, the lubricating medium is transferred to the exhaust vapor via the exhaust vapor chamber, also a negative influence of lubricant cooling on the exhaust vapor cooling will be prevented, which negative influence would, in principle, have to be expected due to the increase in the temperature of the liquid working medium used for cooling. In currently used expansion machines, an opening between the bearing housing and the exhaust vapor chamber guarantees that the lubricant is removed from the bearing via the exhaust vapor chamber. The pressure prevailing in the bearing housing is similar to that on the high-pressure side of the expansion machine. Through the pressure difference between the bearing chamber and the low-pressure side, the lubricating medium is sucked into the refrigerant vapor and can thus contribute to the cooling of the flowing working medium vapor. The heat transferred to the liquid working medium was extracted from the lubricating medium, so that the temperature of the vapor remains the same, when the exhaust vapor, the lubricating medium and the liquid working medium have been mixed.

The embodiments shown are only exemplary embodiments and the full scope of the present invention is defined by the claims.

The invention claimed is:

1. A device, comprising:
 an expansion machine for generating mechanical energy by expanding vapor of a working medium;
 a generator connected to a shaft of the expansion machine and used for generating electric energy from mechanical energy of the expansion machine;
 the expansion machine and the generator being arranged in a common housing and forming a structural unit with an exhaust vapor chamber arranged between the expansion machine and the generator, such that, when the expansion machine is in operation, a working medium entering said common housing flows through said expansion machine and is expanded by said expansion machine without leaving the common housing and thereafter the working medium enters into the exhaust vapor chamber and flows from said exhaust vapor chamber through and in contact with said generator without leaving said common housing, wherein a substantial portion of the working medium flows through the generator; and
 at least one opening for feeding a liquid working medium into the exhaust vapor chamber in addition to said expanded working medium for cooling said expanded working medium before contacting said generator, wherein cooling said expanded working medium in the exhaust vapor chamber occurs by evaporation enthalpy of the liquid working medium.

2. The device according to claim 1, wherein the structural unit comprises a housing, and wherein the at least one opening extends through the housing of the structural unit.

3. The device according to claim 2, wherein the shaft is configured as a hollow shaft and the at least one opening comprises one or a plurality of openings in said hollow shaft.

4. The device according to claim 2, further comprising at least one nozzle, which is arranged at one or a plurality of the openings, the nozzle or nozzles being configured to control a flow of the liquid working medium into the exhaust vapor chamber.

5. The device according to claim 1, wherein the shaft is configured as a hollow shaft and the at least one opening comprises one or a plurality of openings in said hollow shaft.

6. The device according to claim 5, further comprising at least one nozzle, which is arranged at one or a plurality of the openings, the nozzle or nozzles being configured to control a flow of the liquid working medium into the exhaust vapor chamber.

7. The device according to claim 1, further comprising at least one nozzle, which is arranged at one or a plurality of the openings, the nozzle or nozzles being configured to control a flow of the liquid working medium into the exhaust vapor chamber.

8. The device according to claim 1, wherein the at least one opening is in communication with a feed line for feeding liquid working medium into the exhaust vapor chamber.

9. The device according to claim 8, further comprising a valve, wherein the feed line is in communication with the valve for adjusting a mass flow of the fed working medium in the feed line.

10. The device according to claim 9, further comprising:
 at least one selected from the group consisting of:
 a temperature sensor for measuring a vapor temperature in the exhaust vapor chamber;
 a temperature sensor in the generator for measuring a winding temperature; and
 a control or regulating unit for controlling or regulating the valve or the orifice depending on at least one selected from the group consisting of the measured vapor temperature and winding temperature.

11. An ORC device, comprising:
 a device comprising:

an expansion machine for generating mechanical energy by expanding vapor of a working medium;

a generator connected to a shaft of the expansion machine and used for generating electric energy from mechanical energy of the expansion machine;

the expansion machine and the generator being arranged in a common housing and forming a structural unit with an exhaust vapor chamber arranged between the expansion machine and the generator, such that, when the expansion machine is in operation, a working medium entering said common housing flows through said expansion machine and is expanded by said expansion machine without leaving the common housing and thereafter the working medium enters into the exhaust vapor chamber and flows from said exhaust vapor chamber through and in contact with said generator without leaving said common, wherein a substantial portion of the working medium flows through the generator; and at least one opening for feeding a liquid working medium into the exhaust vapor chamber in addition to said expanded working medium for cooling said expanded working medium before contacting said generator, wherein cooling said expanded working medium in the exhaust vapor chamber occurs by evaporation enthalpy of the liquid working medium;

a feed pump for pumping liquid working medium to an evaporator;

the evaporator for evaporating the liquid working medium; and a condenser for condensing the vaporous working medium which exits the structural unit of the device comprising the expansion machine and the generator.

12. The ORC device according to claim 11,
wherein a feed line for liquid working medium leading into the exhaust vapor chamber is in fluid communication with a line between the feed pump and the evaporator; or wherein a feed line for liquid working medium leading into the exhaust vapor chamber is in fluid communication with an intermediate space of a multi-stage feed pump; or wherein a feed line for liquid working medium leading into the exhaust vapor chamber is in fluid communication with a line between two feed pumps of an arrangement comprising a plurality of consecutive feed pumps; or wherein an additional pump is provided for pumping the liquid working medium in a feed line.

13. The ORC device according to claim 11, further comprising:
an additional feed line for feeding a lubricating medium to one or a plurality of lubrication points of the expansion machine; and a heat exchanger for cooling the lubricating medium with the working medium conducted to the exhaust vapor chamber.

14. A method for operating an expansion machine, comprising the following steps:
generating mechanical energy by expanding vapor of a working medium in the expansion machine;

generating electric energy from mechanical energy of the expansion machine by a generator connected to a shaft of the expansion machine;

the expansion machine and the generator being arranged in a common housing and forming a structural unit with an exhaust vapor chamber arranged between the expansion machine and the generator, such that, when the expansion machine is in operation, a working medium entering said common housing flows through said expansion machine and is expanded by said expansion machine without leaving said common housing and, thereafter, the expanded working medium enters into the exhaust vapor chamber and, thereafter, the expanded working medium flows through said generator and contacts the generator without leaving said common housing, wherein a substantial portion of the working medium flows through the generator; and feeding liquid working medium into the exhaust vapor chamber in addition to said expanded working medium for cooling the expanded working medium before contacting said generator, wherein cooling said expanded working medium in the exhaust vapor chamber occurs by evaporation enthalpy of the liquid working medium.

15. The method according to claim 14, comprising the further step of:
adjusting a mass flow of the fed working medium in a feed line for liquid working medium leading into the exhaust vapor chamber.

16. The method according to claim 15, comprising the further steps of:
measuring at least one selected from the group consisting of the vapor temperature in the exhaust vapor chamber and a winding temperature of the generator; and adjusting the mass flow of the fed working medium by controlling or regulating a narrowing cross-section in the feed line depending on at least one selected from the of the measured vapor temperature and the winding temperature.

17. The method according to claim 14, comprising the additional steps:
feeding a lubricating medium to one or a plurality of lubrication points of the expansion machine; and cooling the lubricating medium by the working medium fed to the exhaust vapor chamber.

* * * * *